(12) United States Patent
Sue (10) Patent No.: US 10,594,897 B2
(45) Date of Patent: Mar. 17, 2020

(54) AUTHENTICATING APPARATUS THAT AUTHENTICATES OPERATORS

(71) Applicant: KYOCERA Document Solutions Inc., Osaka (JP)

(72) Inventor: Tomohiro Sue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/172,184

(22) Filed: Oct. 26, 2018

(65) Prior Publication Data

US 2019/0132482 A1  May 2, 2019

(30) Foreign Application Priority Data

Oct. 26, 2017 (JP) ................................. 2017-207005

(51) Int. Cl.
*G01G 19/52* (2006.01)
*G01G 19/44* (2006.01)
(Continued)

(52) U.S. Cl.
CPC .......... *H04N 1/4426* (2013.01); *G01G 19/40* (2013.01); *G01G 19/44* (2013.01); *G01G 19/52* (2013.01);
(Continued)

(58) Field of Classification Search
CPC ...... G06F 21/608; G06F 21/32; G06F 3/1238; H04N 1/00854; H04N 1/4406;
(Continued)

(56) References Cited

U.S. PATENT DOCUMENTS 6,354,996 B1 * 3/2002 Drinan ................. A61B 5/0537
128/903
2011/0231310 A1 * 9/2011 Roberts ................. G06F 21/316
705/40
(Continued)

FOREIGN PATENT DOCUMENTS

CN    202243009 U    5/2012
CN    102955384 A    3/2013
(Continued)

OTHER PUBLICATIONS

China National Intellectual Property Administration. Office Action of foreign counterpart dated Sep. 27, 2019.

*Primary Examiner* — Chad Dickerson
(74) *Attorney, Agent, or Firm* — Hawaii Patent Services; Nathaniel K. Fedde; Kenton N. Fedde (57) ABSTRACT

Provided is an authenticating apparatus that, in the case where authentication is performed repeatedly for the same operator, is capable of performing authentication without the operator having to consciously input unique information from the second time on. The weight scale measures the weight of an operator. The weight-registering unit, when an operator is authenticated as a user registered in an authentication list, registers the measured weight measured by the weight scale in the authentication list as a registered weight of the user. The user-selection-receiving unit receives a selection of a user. The weight-comparing unit authenticates an operator as a user registered in the authentication list by determining whether or not the registered weight of a user, of which a selection is received by the user-selection-receiving unit, is registered in the authentication list, and comparing the measured weight and the registered weight.

4 Claims, 6 Drawing Sheets

| USER NAME | PASSWORD | REGISTERED WEIGHT | REGISTRATION TIME |
|---|---|---|---|
| USER A | 1234***** | 45.05kg | 10:20 |
| USER B | 2345***** | 68.25kg | 09:15 |
| USER C | 3456***** | – | – |
| USER D | 4567***** | – | – |
| USER E | 5678***** | 76.31kg | 12:43 |
| USER F | 6789***** | 50.32kg | 11:50 |
| USER G | 7891***** | 63.23kg | 10:36 |
| USER H | 8912***** | – | – |
| USER I | 9123***** | – | – |

(51) Int. Cl.
*G06F 21/31* (2013.01)
*H04N 1/00* (2006.01)
*H04N 1/44* (2006.01)
*G01G 19/40* (2006.01)

(52) U.S. Cl.
CPC ......... *G06F 21/31* (2013.01); *H04N 1/00413* (2013.01); *H04N 2201/0094* (2013.01)

(58) Field of Classification Search
CPC .. H04N 1/4413; H04N 1/442; G06K 15/4095; G06K 9/00362; G06K 9/369; G06K 9/00885; G07C 9/00563; G07C 9/00158; G07C 9/00892; G01G 19/4146; G01G 19/44; G01G 19/50; A61B 5/0537; A61B 8/585; A61B 6/545
USPC ............. 340/5.82, 5.2, 5.52, 5.83, 5.8, 5.81; 382/115; 726/7, 28; 713/186; 358/1.9, 358/2.1, 1.11–1.18; 902/3
See application file for complete search history.

(56) References Cited

U.S. PATENT DOCUMENTS

| | | |
|---|---|---|
| 2013/0050736 A1 | 2/2013 | Akahira et al. |
| 2015/0109105 A1* | 4/2015 | Shimizu ............... A61B 5/1171 340/5.82 |
| 2017/0061224 A1* | 3/2017 | Moliner ................. G06F 16/22 |

FOREIGN PATENT DOCUMENTS

| | | | |
|---|---|---|---|
| CN | 103854363 A | | 6/2014 |
| JP | 2005-006259 A | | 1/2005 |
| JP | 2007179474 A | * | 7/2007 |
| JP | 2010-046976 A | | 3/2010 |

* cited by examiner

| USER NAME | PASSWORD | REGISTERED WEIGHT | REGISTRATION TIME |
|---|---|---|---|
| USER A | 1234****** | 45.05kg | 10:20 |
| USER B | 2345****** | 68.25kg | 09:15 |
| USER C | 3456****** | – | – |
| USER D | 4567****** | – | – |
| USER E | 5678****** | 76.31kg | 12:43 |
| USER F | 6789****** | 50.32kg | 11:50 |
| USER G | 7891****** | 63.23kg | 10:36 |
| USER H | 8912****** | – | – |
| USER I | 9123****** | – | – |

FIG.5

AUTHENTICATING APPARATUS THAT AUTHENTICATES OPERATORS

INCORPORATION BY REFERENCE

This application is based on and claims the benefit of priority from Japanese Patent Application No. 2017-207005 filed on Oct. 26, 2017, the contents of which are hereby incorporated by reference.

BACKGROUND

The present disclosure relates to an authenticating apparatus that authenticates operators.

In the case of using and sharing electronic equipment such as a copy machine, multifunction peripheral (MFP) and the like in an office, authentication of an operator is performed by an authenticating apparatus in order to understand the conditions of use and to perform billing management. Authentication of an operator is typically a method that is performed by using an identification code (individual ID and password). Input of the identification code is performed by manual input or by using an IC card. In addition, there are also techniques for performing authentication of an operator in which, by arranging a fingerprint sensor, there is no need to input an identification code.

SUMMARY

The authenticating apparatus according to the present disclosure is an authenticating apparatus that authenticates an operator as a user registered in an authentication list by receiving input from an operator of a candidate of unique information that does not change over time, and comparing the input with the unique information registered in the authentication list and correlated with a user. The authenticating apparatus includes a weight scale, a weight-registering unit, a user-selection-receiving unit, and a weight-comparing unit. The weight scale measures the weight of an operator. The weight-registering unit, when an operator is authenticated as a user registered in the authentication list, registers the measured weight measured by the weight scale in the authentication list as a registered weight of the user. The user-selection-receiving unit receives a selection of a user registered in the authentication list. The weight-comparing unit authenticates an operator as a user registered in the authentication list by determining whether or not the registered weight of a user, of which a selection is received by the user-selection-receiving unit, is registered in the authentication list, and when the registered weight is registered in the authentication list, comparing the measured weight and the registered weight.

DETAILED DESCRIPTION

Next, embodiments according to the present disclosure will be explained in detail with reference to the drawings.

Figure 1:
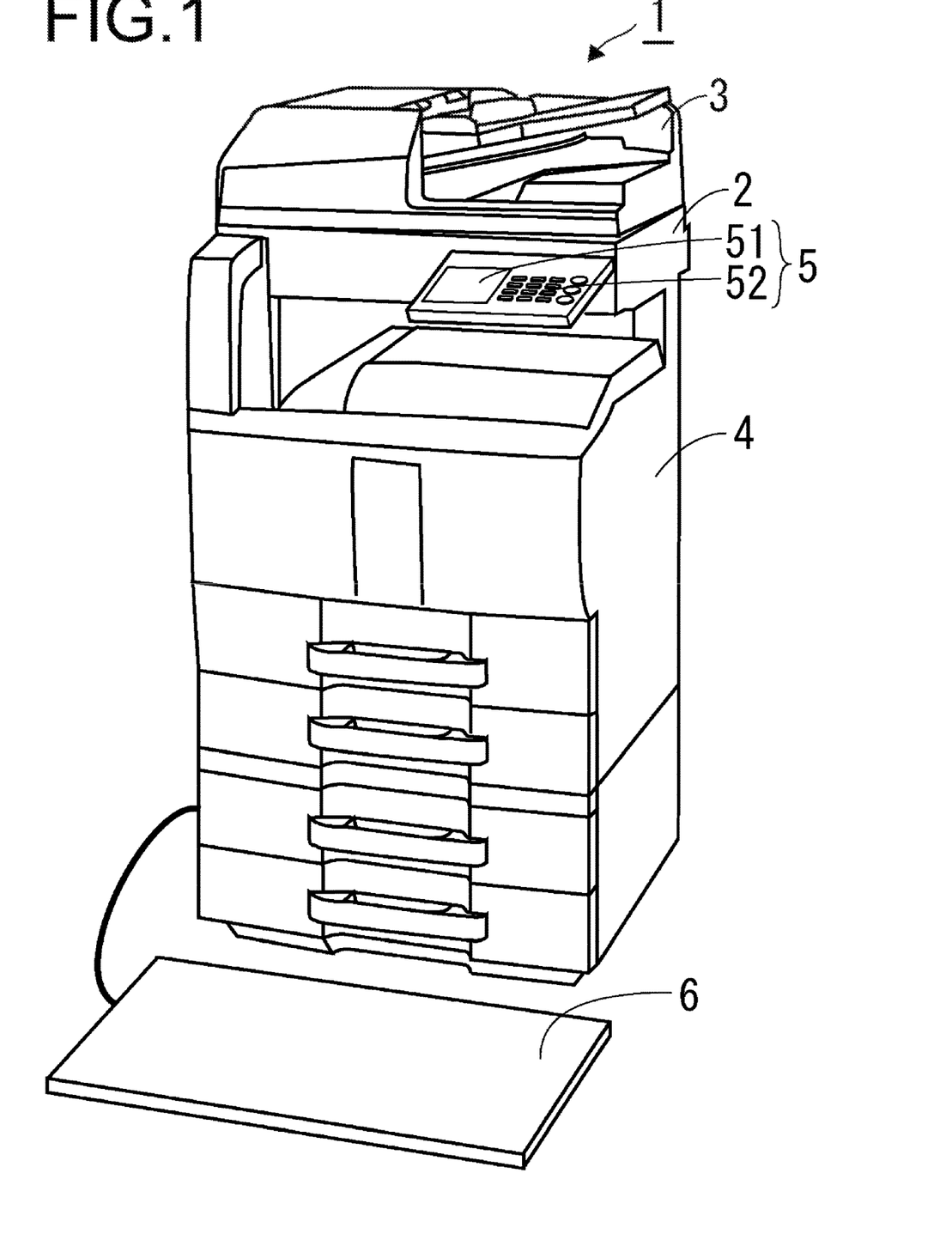
FIG. 1 is an external perspective view of an image forming apparatus that functions as an authenticating apparatus according to the present disclosure.

The authenticating apparatus according to the embodiments is an image forming apparatus 1 such as a copy machine, a multifunction peripheral and the like that uses an electrophotographic method. Referring to FIG. 1, the image forming apparatus 1 includes a document-reading unit 2, a document-feeding unit 3, a printing unit 4, an operation unit 5, and weight scale 6. The document-feeding unit 3 is arranged on an upper portion of the document-reading unit 2, and the document-reading unit 2 is arranged on an upper portion of the printing unit 4. A paper-discharge space for recording paper is formed between the document-reading unit 2 and the printing unit 4.

The document-reading unit 2 includes a light source and an imaging element, and includes a scanner that together with guiding light from a light source such as an LED or the like to an image surface of a document, guides reflected light from the image surface to an imaging element such as a CCD sensor or the like.

The document-feeding unit 3, by a document-conveying mechanism, repeatedly feeds documents that are placed in a document-placement to the document-reading unit 2 one sheet at a time.

The printing unit 4 is a printing unit that performs printing on recording paper by an electrophotographic process or the like, and includes a paper-supply cassette that stores recording paper to be fed to the printing unit.

The operation unit 5 is provided with a touch panel 51 and operation buttons 51. An operator performs various settings of the image forming apparatus 1 and executes various functions such as a scanning operation, image-forming operation and the like by operating the operation unit 5 and inputting instructions. The touch panel 51 can be used to indicate the state of the image forming apparatus 1, display the image forming status and the number of printed copies, perform various functions such as double-sided printing, black and white reversal and the like, and perform various settings such as a magnification rate setting, density setting and the like. A start button, a stop button, a reset button, and the like are provided as operation buttons 52. The start button instructs the start of a scanning operation or image formation. The stop button instructs the stop of a scanning operation or image formation. The reset button is used when setting the various settings of the image forming apparatus 1 to the default state.

The weight scale 6 is arranged at a position for measuring the weight of an operator operating the operation unit 5.

Figure 2:
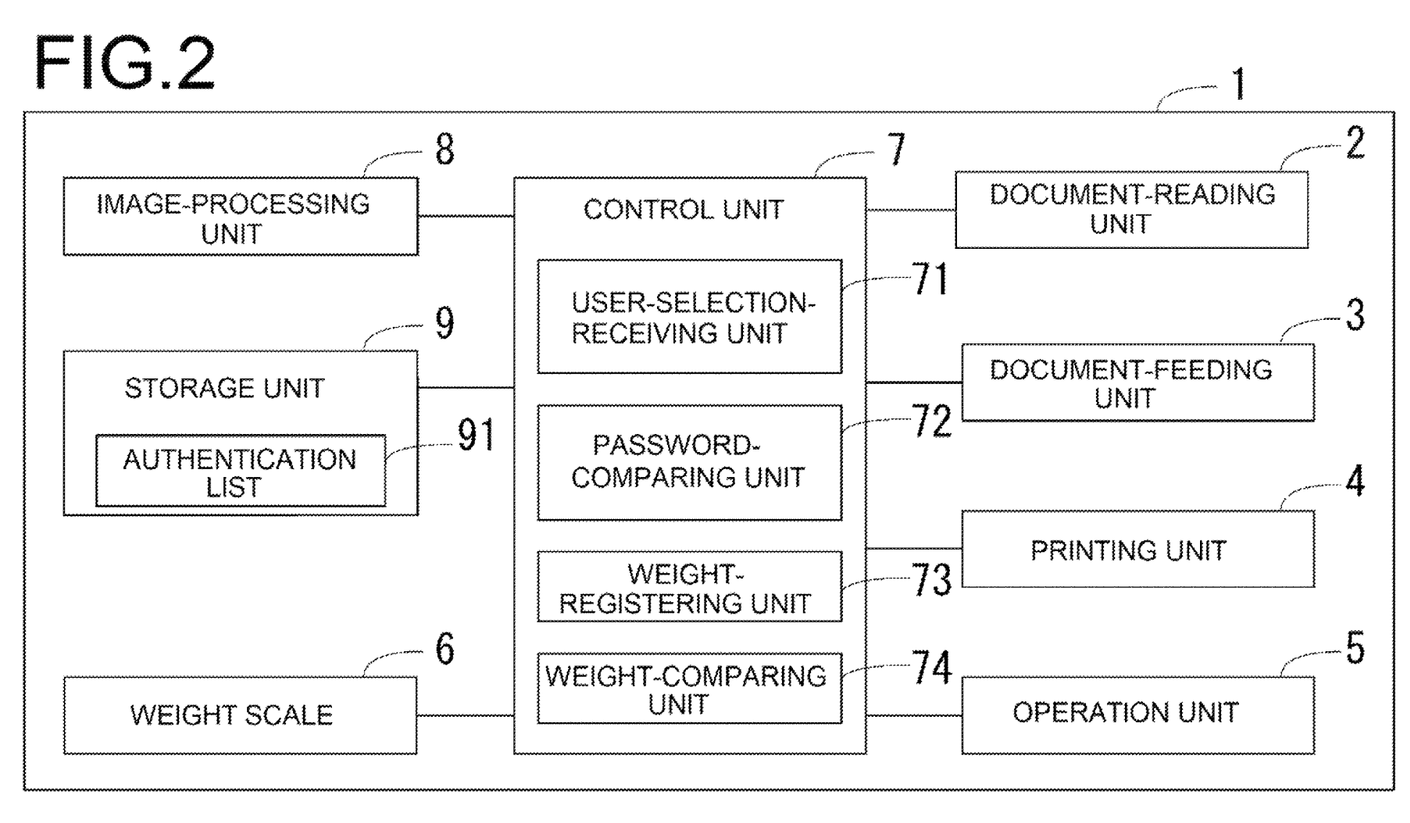
FIG. 2 is a block diagram schematically illustrating a configuration of the image forming apparatus illustrated in FIG. 1.

FIG. 2 is a block diagram schematically illustrating a configuration of the image forming apparatus 1. The above-described document-reading unit 2, document-feeding unit 3, printing unit 4, operation unit 5 and weight scale 6 are connected to a control unit 7, and the control unit 7 controls the operation of these units. In addition, an image-processing unit 8 and storage unit 9 are connected to the control unit 7.

The image-processing unit 8 is a unit for performing certain image processing on image data; for example, image processing such as enlargement/reduction processing, gradation adjustment, density adjustment and the like are performed.

Figure 3:
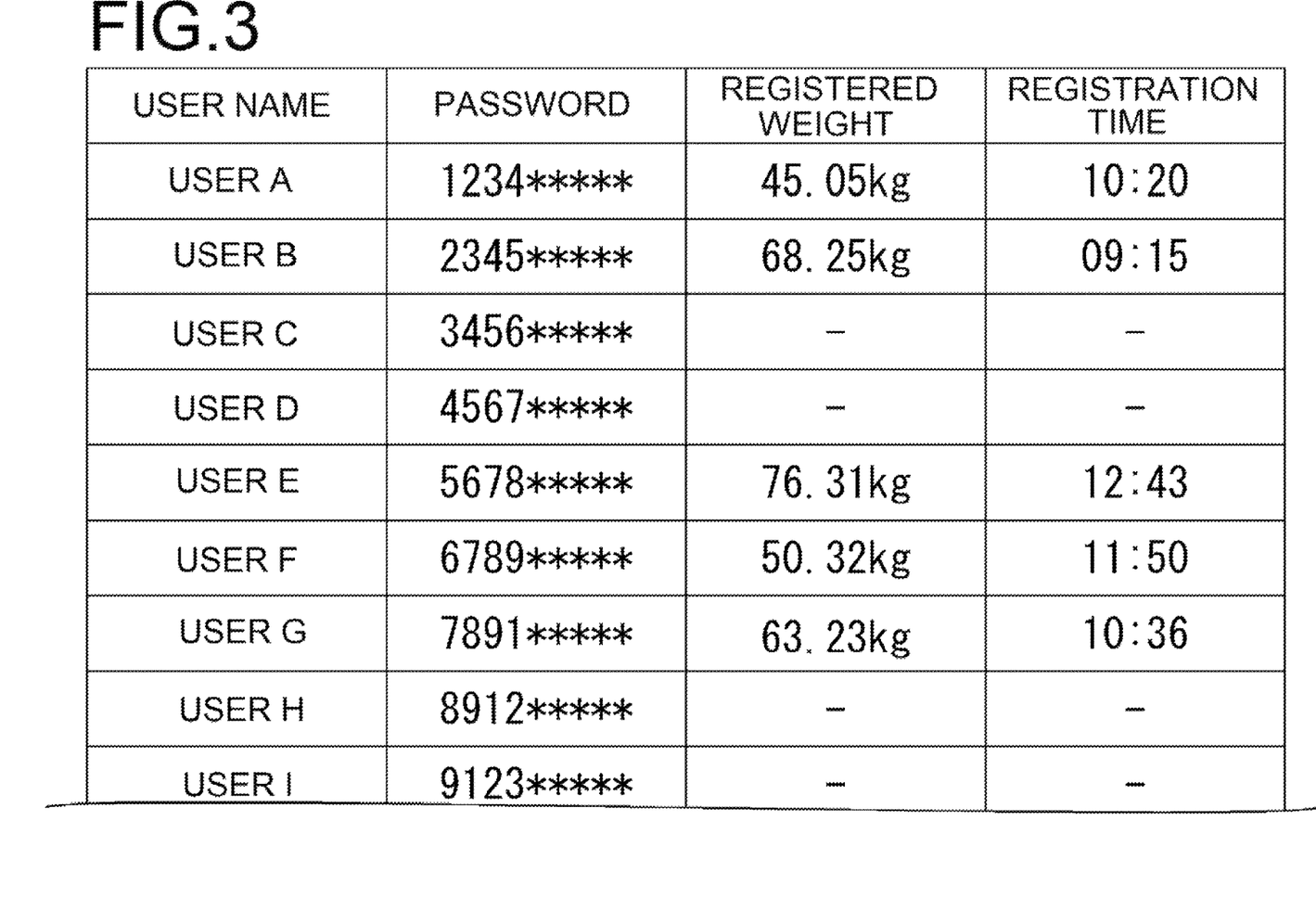
FIG. 3 is a view illustrating an example of the authentication list illustrated in FIG. 2.

The storage unit 9 is a storage unit such as a semiconductor memory, hard disk drive (HDD) or the like, and stores image data acquired by the document-reading unit 2 reading a document. The storage unit 9 stores various kinds of management data including an authentication list 91 for authenticating an operator. As illustrated in FIG. 3, the authentication list 91 correlates and registers users and passwords, and correlates and registers registered weights and registration times measured by the weight scale 6 for the users. In the registration list 91 illustrated in FIG. 3, users A to I are registered as users authorized to use the image forming apparatus 1.

The control unit 7 is an information-processing unit such as a microcomputer or the like that includes a central processing unit (CPU), a read only memory (ROM), a random access memory (RAM) and the like. The ROM stores a control program for performing control of the operation of the image forming apparatus 1. The control unit 7 reads the control program that is stored in the ROM, and by developing the control program in the RAM, performs overall control of the apparatus according to specified instruction information inputted from the operation unit 5. In addition, the control unit 7 functions as a user-selection-receiving unit 71, a password-comparing unit 72, a weight-registering unit 73 and a weight-comparing unit 74.

Figure 4A:
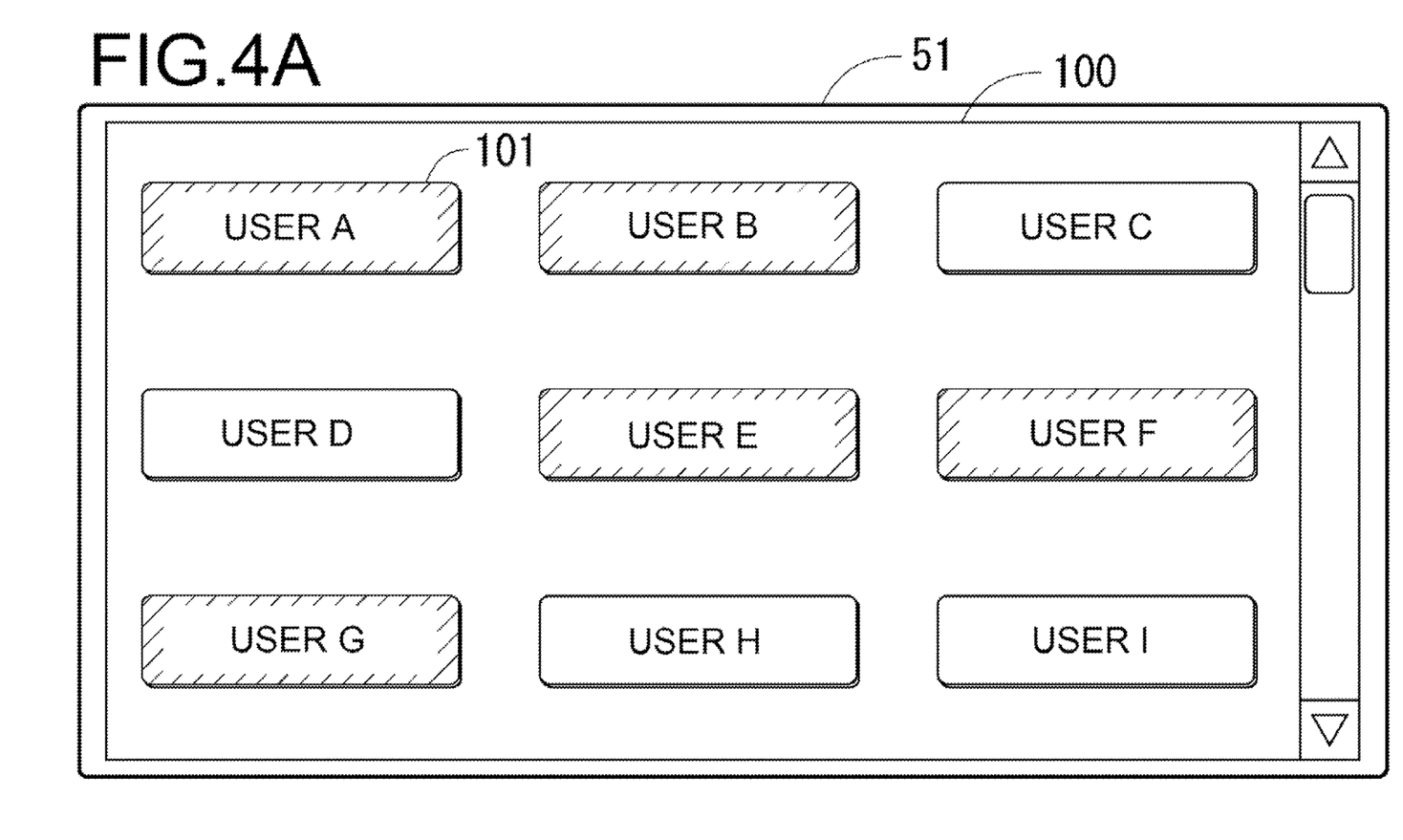
FIG. 4A is a view illustrating an example of a display on the operation unit illustrated in FIG. 2.

The user-selection-receiving unit 71 displays a user-selection screen 100 as illustrated in FIG. 4A on the touch panel 51 of the operation unit 5, and receives a user selection by the operator. A list of users registered in the authentication list 91 is arranged on the user-selection screen 100 as respective user-selection buttons 101 for selecting each user. The user-selection-receiving unit 71 then receives a user selection in accordance to operation of a user-selection button 101.

Incidentally, on the user-selection screen 100, the user-selection buttons 101 are distinctly displayed according to whether or not weight is registered in the authentication list 91. In the example illustrated in FIG. 4A, hatched shading is applied to the user-selection buttons 101 that select users A, B, E, F, G whose weights are registered in the authentication list 91. As a result, these user-selection buttons 101 are distinguished from the user-selection buttons 101 that select users C, D, H, I whose weights are not registered in the authentication list 91.

Figure 4B:
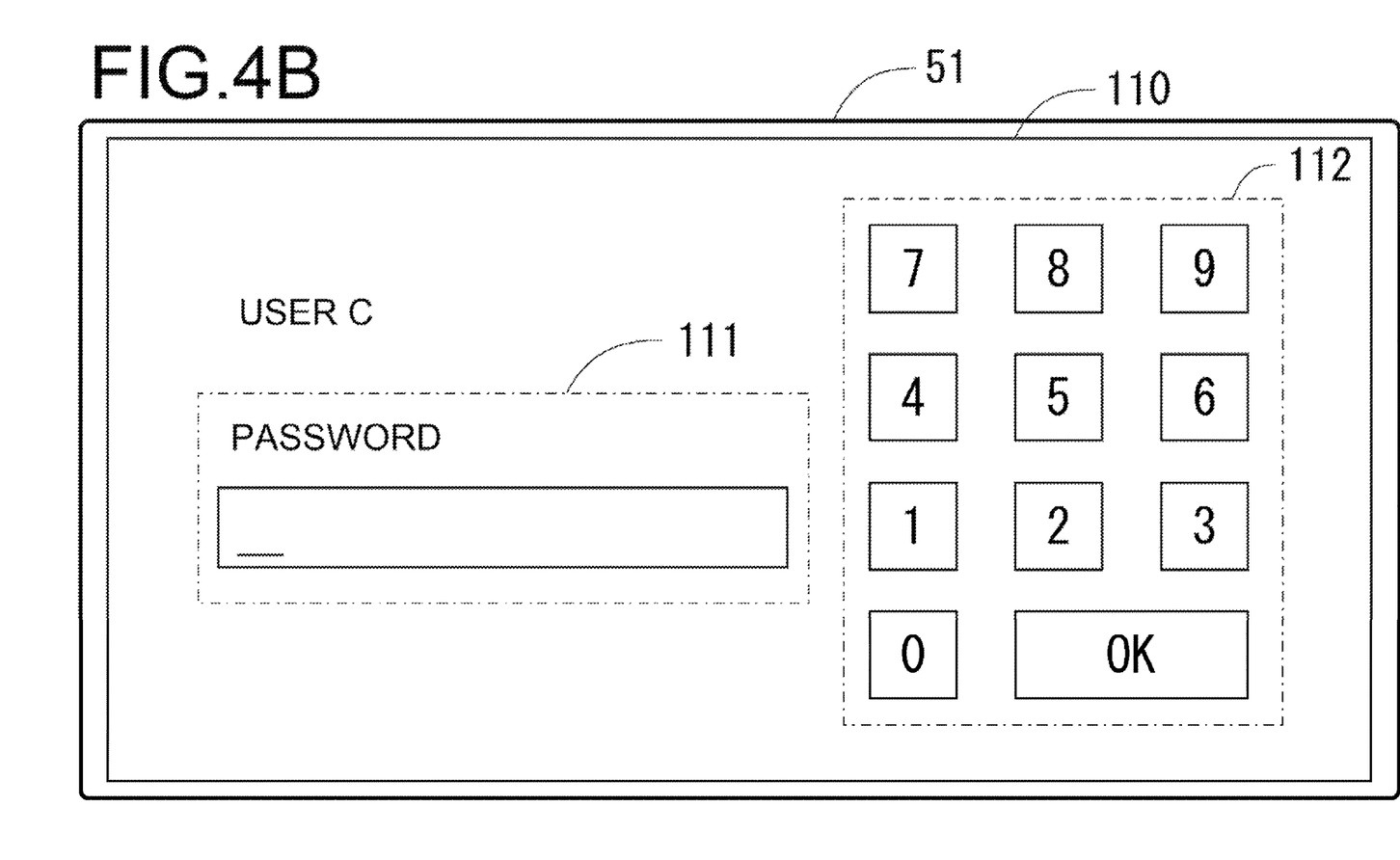
FIG. 4B is a view illustrating an example of a display on the operation unit illustrated in FIG. 2.

The password-comparing unit 72 displays a password-input screen 110 as illustrated in FIG. 4B on the touch panel 51 of the operation unit 5, and receives input of a password. A user name for which a selection is received on the user-selection screen 100, a password-input field 111 and a password-input unit 112 such as a numeric keypad, keyboard or the like are laid out on the password-input screen 110.

The password-comparing unit 72 then compares a password, input of which is received on the password-input screen 110, with a password that is registered in the authentication list 91. In the case where both passwords match, the password-comparing unit 72 authenticates the operator as a user, performs a login process, and allows use of the image forming apparatus 1.

Incidentally, in this embodiment, authentication that uses a password as unique user information that does not change over time is employed. However, instead of a password, authentication that uses an IC card, a fingerprint, an iris, a face and the like as unique user information that does not change over time may be performed.

After the password-comparing unit 72 and/or the weight-comparing unit 74 authenticates an operator as a user, the weight-registering unit 73 registers the weight of the operator that is measured by the weight scale 6 and the measurement time in the authentication list 91 as the registered weight and registration time of the authenticated user. Incidentally, in the case where the registered weight and registration time are registered in the authentication list 91, the weight-registering unit 73 updates and registers the registered weight and registration time. As a result, the most recent registered weight and registration time are registered in the authentication list 91. In addition, the weight-registering unit 73 deletes old registered weights and registration times at a specific timing (for example when the power is turned ON, at a specified time, or the like). As a result, old registered weights and registration times can be cleared from the authentication list 91.

The weight-comparing unit 74 compares the registered weight in the authentication list 91 and the measured weight of the operator measured by the weight scale 6, and in the case where the variation amount between the registered weight and measured weight is less than a specific threshold value, authenticates the operator as a user registered in the authentication list 91 and performs a login process.

Figure 5:
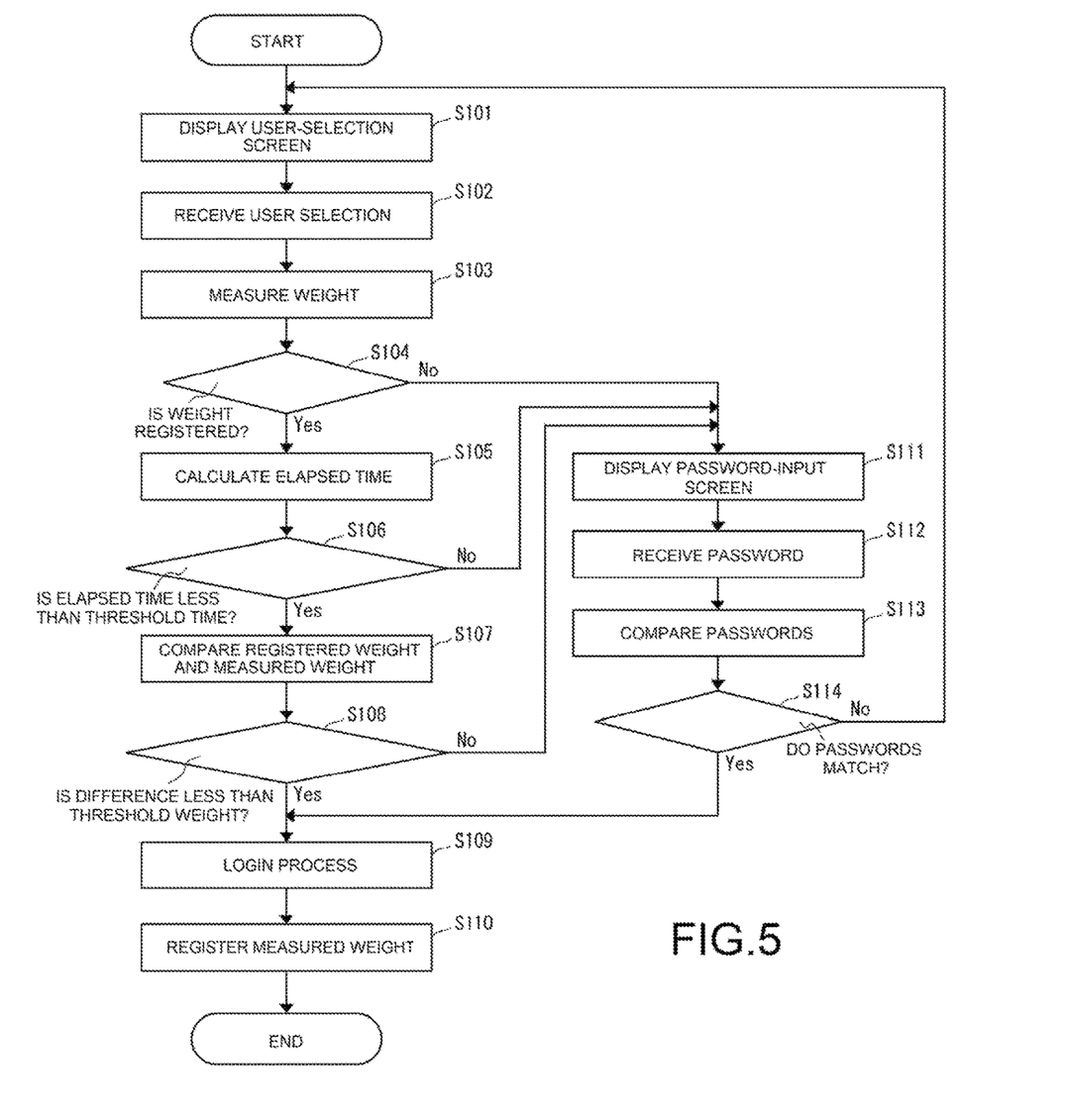
FIG. 5 is a flowchart for explaining an authenticating operation by the image forming apparatus illustrated in FIG. 1.

Next, the authentication operation by the image forming apparatus 1 will be explained in detail with reference to FIG. 5.

The control unit 7 functions as the user-selection-receiving unit 71 and displays the user-selection screen 100 on the touch panel 51 of the operation unit 5 (step S101), then receives a user selection by the operator (step S102).

Moreover, after the user selection is received in step S102, the control unit 7 functions as the weight-registering unit 73 and measures the weight of the operator by the weight scale 6 (step S103).

Next, the control unit 7 determines whether or not the weight of the user for which a selection is received in step S102 is registered as a registered weight in the authentication list 91 (step S104).

In step S104, when the weight of the user is registered in the authentication list 91, the control unit 7 functions as the weight-comparing unit 74. The weight-comparing unit 74 calculates the elapsed time from the registration time in the authentication list 91 until the current time (step S105), and determines whether or not the elapsed time is less than a preset threshold time (step S106).

In step S106, when the elapsed time is less than the threshold time, the weight-comparing unit 74 compares the registered weight in the authentication list 91 with the measured weight of the user measured in step S103 (step S107). Then, the weight-comparing unit 74 calculates the difference (absolute value) between the registered weight and the measured weight as the variation amount between the registered weight and the measured weight. The weight-comparing unit 74 then determines whether or not the calculated difference is less than a preset threshold weight (step S108). Incidentally, the weight-comparing unit 74 may calculate the variation rate (absolute value) as the variation amount between the registered weight and the measured weight, and determine whether or not the variation rate is less than a threshold rate.

In step S108, when the difference is less than the threshold weight, the weight-comparing unit 74 authenticates the operator as a user, performs a login process (step S109), and allows use of the image forming apparatus 1. As a result, the operator is allowed to use the image forming apparatus 1 by simple authentication by weight without having to input a password.

Moreover, after the operator is authenticated as a user, the control unit 7 functions as the weight-registering unit 73 and registers the weight of the operator measured in step S103 and the measurement time in the authentication list 91 as the registered weight and registration time of the authenticated user (step S110), and then ends the authentication operation.

Incidentally, the threshold time that is compared with the elapsed time in step S106 is a period during which simple authentication by weight is permitted. Therefore, when the threshold time is set to a long time, the authentication operation is performed based on an old registered weight and registration time, so it is best that the threshold time be set to a relatively short time during which the variation in weight is considered to be small (for example, 1 hour or the like). Moreover, the threshold time may be settable by an administrator of the image forming apparatus 1.

Incidentally, the threshold weight that is compared with the difference in step S108 is for taking into consideration measurement error by the weight scale 6 and slight variations in weight due to eating, drinking and the like. Therefore, the threshold weight should be set to a relatively small value (for example, a few hundred grams, or the like). Moreover, the threshold weight may be settable by an administrator of the image forming apparatus 1. Furthermore, the threshold weight may be changed in accordance with the elapsed time. In that case, it is presumed that the variation in weight will become larger as the elapsed time becomes longer, so the threshold weight should be set to become larger as the elapsed time becomes longer.

In step S104, when the weight of the user is not registered in the authentication list 91, or in step S106 when the elapsed time is equal to or greater than the threshold time, or in step S108 when the difference is equal to or greater than the threshold weight, the control unit 7 functions as the password-comparing unit 72. The password-comparing unit 72 displays a password-input screen 110 on the touch panel 51 of the operation unit 5 (step S111), and receives input of a password (step S112). Then, the password-comparing unit 72 compares a password, the input of which is received on the password input screen 110, with a password that is registered in the authentication list 91 (step S113), and determines whether or not both passwords match (step S114).

In the case where both passwords match in step S114, the password-comparing unit 72 moves to step S109, authenticates the operator as a user, performs a login process, and allows use of the image forming apparatus 1.

In the case where both passwords do not match in step S114, the password-comparing unit 72 does not authenticate the operator as a user; the control unit 7 then functions as the user-selection-receiving unit 71 and returns to step S101, and displays the user-selection screen 100 on the touch panel 51 of the operation unit 5.

Incidentally, in this embodiment, the registered weights registered in the authentication list 91 are deleted at a specific timing, however, by storing a history of the registered weights, that history data could also be useful in health management of the users. The history data of registered weights may be transferred via a network to PC terminals or portable terminals, or may be printed on recording paper.

As explained above, this embodiment is an authenticating apparatus that authenticates an operator as a user registered in an authentication list 91 by receiving input of a password from an operator as a candidate of unique information that does not change over time, and comparing the received password with a password that is correlated with a user and registered in the authentication list 91, and includes: a weight scale 6 that measures the weight of the operator, a weight-registering unit 73 that registers the measured weight measured by the weight scale 6 as the registered weight of the user in the authentication list 91 when the operator is authenticated as a user registered in the authentication list 91; a user-selection-receiving unit 71 that receives a selection of a user registered in the authentication list 91; and a weight-comparing unit 74 that authenticates the operator as a user registered in the authentication list 91 by determining whether or not the registered weight of the user, the selection of which is received by the user-selection-receiving unit 71, is registered in the authentication list 91, and comparing the measured weight and the registered weight when the registered weight is registered in the authentication list 91.

With this configuration, in the case where the same operator repeatedly uses the image forming apparatus 1 during a short period of time, the measured weight of the operator that is measured during the first time authentication is performed is registered as the registered weight, and from the second time on, the authentication operation is performed by comparing the measured weight with the registered weight, so authentication can be performed without the operator having to consciously input unique information.

Furthermore, in this embodiment, the weight-comparing unit 74 authenticates the operator as a user registered in the authentication list 91 in the case where the variation amount between the registered weight and the measured weight is less than a specified threshold value.

With this configuration, authentication can be performed by a weight that takes into account measurement error by the weight scale 6 and/or slight variations in weight due to eating, drinking and the like.

Furthermore, in this embodiment, the weight-registering unit 73 registers the time when the measured weight is measured in the authentication list 91 as the registration time, and the weight-comparing unit 74 compares the measured weight and the registered weight when the elapsed time from the registration time of the user for which a selection is received until the current time is less than a specified threshold time.

With this configuration, a period can be set during which simple authentication by weight is allowed.

In addition, in this embodiment, the weight-registering unit 73 deletes registered weights that are registered in the authentication list 91 at specified timing.

With this configuration, old registered weights can be cleared from the authentication list 91.

In a typical technique, even when the same operator repeatedly uses an apparatus within a short period of time, there is a problem in that it is necessary for the operator to consciously perform authentication each time, which is cumbersome. In the typical technique described above, an operator must input an identification code each time an apparatus is used. Moreover, in a technique of arranging a fingerprint sensor, an operator must consciously operate the sensor with the underside of a finger each time an apparatus is used.

Taking into consideration the problems described above, the object of the technology according to the present disclosure is to provide an authenticating apparatus that, in the case where authentication is performed repeatedly for the same operator, is capable of performing authentication without the operator having to consciously input unique information from the second time on.

With the technology according to the present disclosure, when authentication is performed repeatedly for the same operator, the measured weight of the operator that is measured during the first time that authentication is performed is registered as a registered weight, and from the second time on, the authentication operation is performed by comparing the measured weight with the registered weight, so there is an advantage in that authentication can be performed without the operator having to consciously input unique information.

Note that, the technology according to the present disclosure is not limited to the embodiment described above, and it is clearly understood that each of the embodiments may be appropriately modified within the scope of the technical idea of the present disclosure. Moreover, the number, position, shape and the like of the components described above are not limited to those in the embodiment described above, and a number, position, shape and the like suitable for embodying the technology according to the present disclosure may be used. Incidentally, in each of the drawings, the same reference numbers are used for components that are the same.

What is claimed is:

1. An authenticating apparatus that authenticates an operator as a user registered in an authentication list by receiving input from an operator of a candidate of unique information that does not change over time, and comparing the input with unique information registered in the authentication list and correlated with the user; the authenticating apparatus comprising:
   a weight scale that measures a weight of an operator for registration and measures a weight of an operator for authentication;
   a weight-registering unit that, when an operator is authenticated as the user registered in the authentication list, registers the weight measured for registration in the authentication list as a registered weight of the user;
   a user-selection-receiving unit that receives a selection of a user registered in the authentication list;
   a weight-comparing unit that authenticates an operator as a user registered in the authentication list by determining whether or not the registered weight of the user of which the selection is received by the user-selection-receiving unit is registered in the authentication list, and when the registered weight of the user of which the selection is received by the user-selection-receiving unit is registered in the authentication list, compares the weight measured for authentication and the registered weight of the user of which the selection is received by the user-selection-receiving unit; and
   a display that provides a user-selection screen from which the selection is made, wherein the user-selection screen displays a plurality of user-selection buttons each corresponding to a respective user, and wherein the plurality of user-selection buttons are displayed differently for users for which weight is registered relative to users for which weight is not registered.

2. The authenticating apparatus according to claim 1, wherein
   the weight-comparing unit authenticates an operator as a user registered in the authentication list when a variation amount between the registered weight of the user of which the selection is received by the user-selection-receiving unit and the weight measured for authentication is less than a specified threshold value.

3. The authenticating apparatus according to claim 1, wherein
   the weight-registering unit registers a time at which the weight measured for registration is measured in the authentication list as a registration time; and
   the weight-comparing unit compares the weight measured for authentication and the registered weight of the user of which the selection is received by the user-selection-receiving unit when a time elapsed from the registration time of the user for which a selection is received until the current time is less than a specified threshold time.

4. The authenticating apparatus according to claim 1, wherein
   the weight-registering unit deletes the registered weights registered in the authentication list at a specified timing.

* * * * *